United States Patent [19]

Rahim

[11] Patent Number: 5,281,427
[45] Date of Patent: Jan. 25, 1994

[54] PROCESS FOR PRODUCING PASTRY PRODUCTS

[76] Inventor: Salim K. Rahim, 61 Pendennis Road, Mount Pleasant, Harare, Zimbabwe

[21] Appl. No.: 485,668

[22] Filed: Feb. 27, 1990

[30] Foreign Application Priority Data

Feb. 28, 1989 [RH] Zimbabwe .................. 29/89

[51] Int. Cl.$^5$ .................. A21C 11/00; A21D 13/00
[52] U.S. Cl. .................. 426/297; 99/450.6; 425/376.1; 425/406; 426/502; 426/503; 426/517
[58] Field of Search .................. 426/297, 94, 128, 283, 426/391, 420, 497, 502, 503, 516, 517; 99/450.6; 425/376.1, 406, 132, 133.1; 264/176.1; 294/64.1, 64.3

[56] References Cited

U.S. PATENT DOCUMENTS

| | | | |
|---|---|---|---|
| 3,669,007 | 6/1972 | Pulici | 426/297 |
| 4,073,953 | 2/1978 | Trostmann et al. | 426/502 |
| 4,520,035 | 5/1985 | Lamonica | 426/128 |
| 4,651,635 | 3/1987 | Ally | 99/450.6 |
| 4,687,670 | 8/1987 | Rodriguez | 426/283 |
| 4,753,813 | 6/1988 | Saadia | 426/502 |

Primary Examiner—George Yeung
Attorney, Agent, or Firm—Benjamin J. Barish

[57] ABSTRACT

A process to produce different kinds of pastries in which an extruder forms regular discs of dough with a controlled thickness and diameter by etruding dough through a central opening of a lower circular plate which is heated and to which an upper plate descends to an adjustable distance. For producing samoosas thin discs of dough are formed which are partly cooked at one side, stacked and further pressurized and heated. Each disc is cut into four quarters in which triangles are inscribed with their top on the middle of the circular side of each quarter. Filling material is charged in the middle of each triangle whereupon the four quarters are simultaneously folded into triangles, firstly along the sides and then along the bottom by using three hinged plates, one set for each quarter to be folded. For producing filled tortillas the partly cooked disc of dough is filled and rolled by a rolling machine. For producing chapatis or other flat pastries the partly cooked disc of dough is transferred to a station for finishing the cooking.

9 Claims, 4 Drawing Sheets

PROCESS FOR PRODUCING PASTRY PRODUCTS

The invention relates to a process and machine to produce different kinds of pastries. The processes for making samoosas, chapatis and tortillas are described but the principles for the invention can be used to produce other kinds of pastries.

A process to produce samoosas mechanically is described in GB patent 2146574. According to this process sheets of pastry are formed from which strips are cut out and the strips are folded into samoosas.

However, the present invention can produce different kinds of pastries within the framework of the same process and machine.

According to the present invention the cooking device is fitted to the dough extruder and by forming discs of dough which are cut into quarters, no wastage of dough occurs.

Furthermore, the process of this invention provides moistening of the discs of dough, filling and sealing of the pastries.

The invention described a process to produce different kinds of pastries, comprising a dough extruder which forms regular discs of dough, having a controlled thickness and diameter, cooking means, and devices for cutting, filling and folding or rolling the discs of dough, depending on the kind of pastry.

According to one aspect of the present invention, there is provided a process for producing a food product, comprising forming a thin layer of dough in a first station by extruding dough through a central hole in a lower plate to the upper surface of the lower plate, and effecting relative movement between the lower plate and an overlying plate to flatten the dough into a thin layer of predetermined thickness and area. The thin layer of dough is lifted from the first station by a suction pad and transferred to a second station, where a filling material is applied to the thin layer of dough. The peripheral edges of the thin layer of dough are then closed around the filling material.

According to another aspect of the present invention, there is provided a process for producing food products, comprising extruding dough through a central hole of a lower plate to the upper surface of the lower plate, effecting relative movement between the lower plate and an upper plate overlying the lower plate to flatten the dough to a disc shape of predetermined thickness and diameter, and cooking the dough.

According to further features in the preferred embodiment of the invention described below, the disc of dough is at least partially cooked by heating it when carried by the lower plate. In addition, the dough disc is transferred to a stacking plate and cut into four equal quarters, and filling material is applied to each quarter; each quarter is then folded to enclose its respective filling material. Further, the filling material is applied to each quarter when the respective quarter is carried by a fixed triangular plate; and each quarter is folded by pivotting three triangular plates around the three sides of the fixed triangular plate.

According to still further features in the described preferred embodiment, a plurality of discs of dough are stacked on the stacking plate, oil is applied to the upper surface of each disc of dough before the next disc is stacked thereon, and the stack of dough discs is cut into the four equal quarters.

SAMOOSA PROCESS (FIG. 1)

Figure 1:
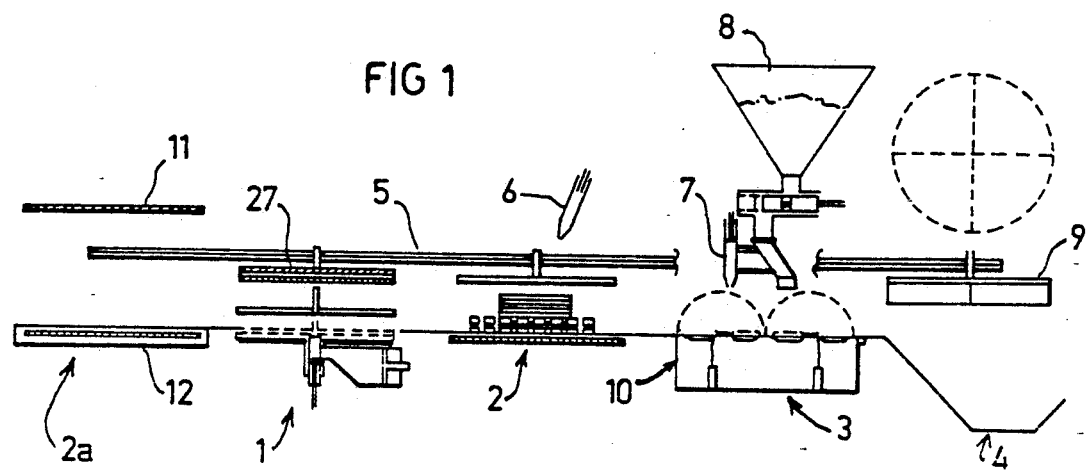
FIG. 1 is an elevation and plan in schematic form of a pastry making assembly showing a cooking station, an extrusion station, a stacking/pressing station, a filling-/folding station and a collection point.

The machine consists of an extrusion station (1) which produces regular discs of dough from a charge of mixed dough. The volume of these discs and their thickness can be controlled to produce different products. The discs may be pre-cooked at the extrusion station before being transferred by a suction lifting pad (27) running on rails (5) to a stacking station (2) where up to fifty discs of pastry can be deposited. Before depositing each layer the previous top surface is oiled by means of a spray (6) to enable later separation. The stacking station can be used to further reduce the thickness of the pastry discs by a pressing process together with the application of heat if desired. The discs of pastry are then separated by means of the lifting pad and transferred to a filling and folding station (3). If the intermediate process of stacking and pressing is not required a single disc can be transferred directly from the extrusion station (1) to the filling and folding station (3). At this station a single circular disc is cut into four quarters by a descending blade (9) also running on the rails (5) and then four charges of filling are delivered from a hopper (8) onto the pastry surface. A folding mechanism then seals the filling into the pastry with the help of a pasting spray (7) which can be applied during the folding process. The finished products are ejected from the filling station (3) onto the collection point (4).

Figure 2:
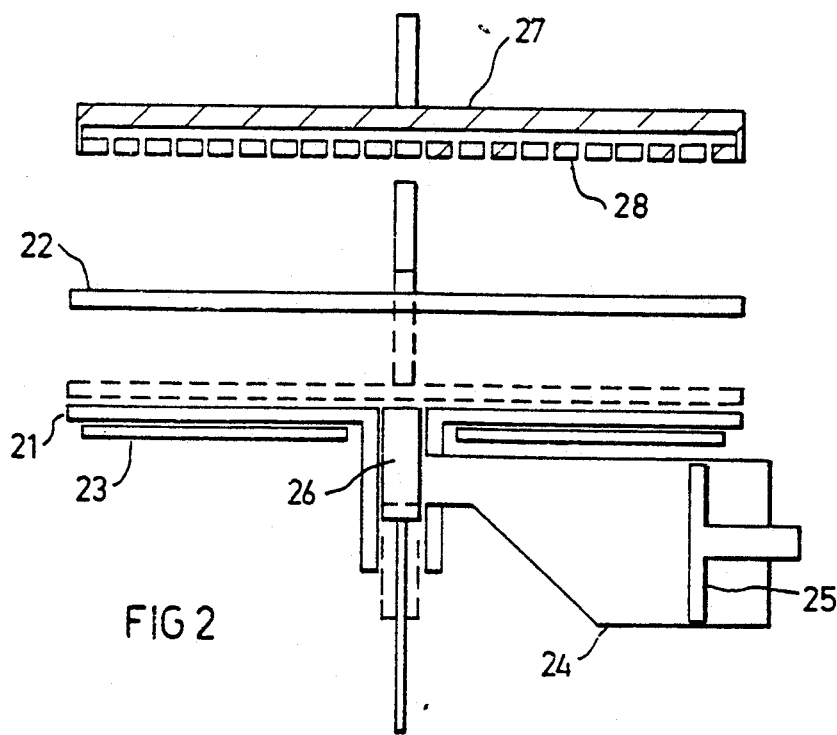
FIG. 2 is an elevation of an extrusion mechanism.
Figure 3:
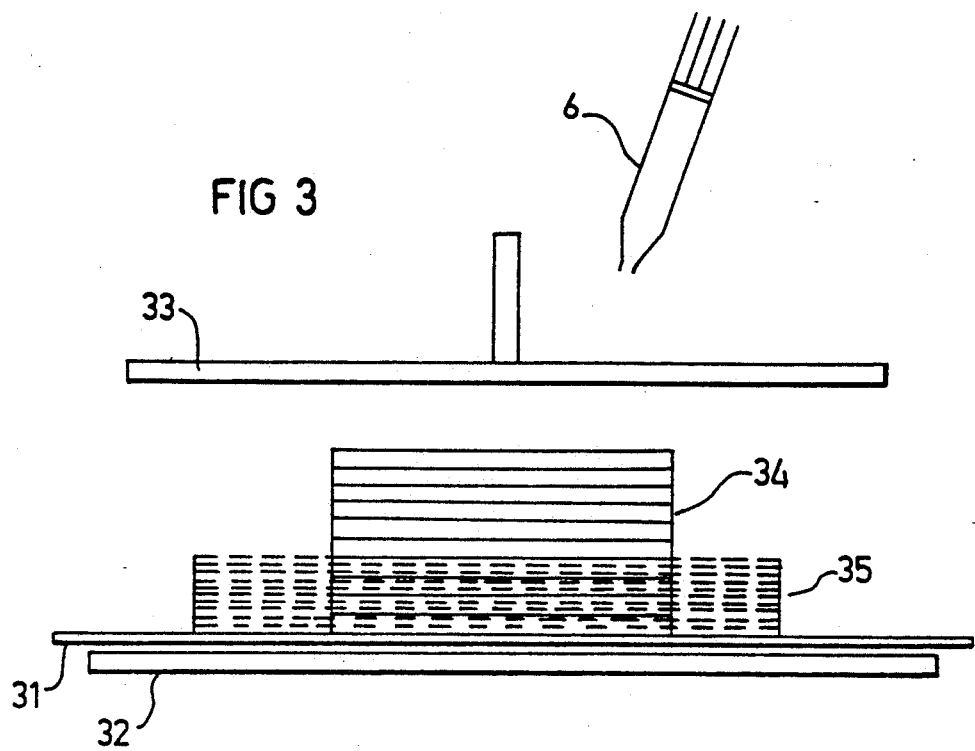
FIG. 3 is an elevation of a stacking and pressing station.

With reference to FIG. 2, the extrusion station comprises a lower circular plate (21) with a central hole which can be heated by means of a heating element (23). An upper circular plate (22) can descend to within a small, adjustable distance of the lower plate (21). A close-fitting cylindrical piston (26) slides vertically in the central hole in the lower plate (21). A dough container (24) carries a moving piston (25) which acts to extrude a small portion of dough into the space above the piston (26) which at this point is in its lower position. The piston (26) then rises under the action of a linear actuating mechanism to seal off the exit from the container (24) and bring the portion of dough up to the level of the lower plate (21). The lower plate (21) and the piston (26) thus form together a continuous circular surface. The upper plate (22) is lowered by means of a linear actuating mechanism and forms the dough into a circular disc, at the same time pre-cooking the dough by means of the heat from the heating element (23). The disc of pastry can be transferred from the extrusion station by means of a lifting pad (27) which carries a plurality of small holes (28) connected to an evacuator. By means of the suction produced the disc of pastry clings to the underside of the lifting pad (27) and can be transferred to the other stations (2, 2A, 3 in FIG. 1). Discs of pastry of varying volumes can be obtained by varying the time for which piston (25) moves before piston (26) rises and carries the portion of dough upwards. Discs of varying thickness are obtained by varying the final separation of the plates (21, 22). The diameter of the discs is determined by the volume and thickness.

With reference of FIG. (3) the stacking/pressing station comprises a lower plate (31) which may be heated by means of a heating element (32). Discs of pastry can be stacked (34) using the lifting pad (27) of FIG. 2. Before adding a disc the top surface of the previous disc is oiled using the spray (6). The pressing plate (33) descends onto the stacked discs of dough (34) and presses them, reducing their thickness and increasing their diameter (35). The application of heat from the heating element (32) helps to enable separation of the thin discs from the stack (35). The suction lifting pad (27) can remove single discs from the stack (35) and transfer them to the filling/folding station (3) of FIG. (1).

Figure 4:
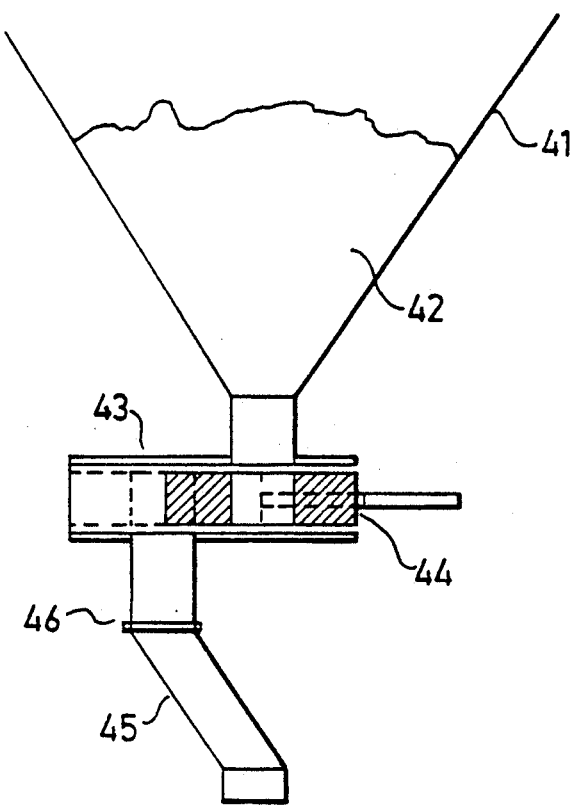
FIG. 4 is an elevation of a mechanism for producing and depositing uniform portions of filling.

With reference of FIG. 4, the filling mechanism comprises a hopper (41) containing a charge of filling (42) for example cooked meat or vegetables and spices. The hopper terminates in an aperture which coincides with an aperture in a slideway (43) carrying a slide (44). The slide (44) contains an aperture 44a which fills from the hopper when the slide is in the position shown. The slide is the moved by means of a linear actuating device to the position shown in dashed lines. This action seals the exit from the hopper (41) and brings the aperture 44a in the slide (44) over an aperture in the lower surface of the slideway (43) so that the amount of filling drops through a chute (45). The chute (45) is cranked and includes a rotating joint (46) so that the amount of filling can be deposited in a range of positions about the arc of a circle in plan view.

With reference to FIG. (5) the method of folding samoosas is shown. A full circular disc of pastry (a) is first cut into quarters as shown. Each quarter AOB will form one samoosa. In each quarter (b) a triangle CDE may be inscribed with the angle DEC equal to 55 degrees. The amount of filling is deposited within this triangle. The first folding stage (c) is to fold along a line DE so that the section ADE overlays the filling. Paste such as a flour-and-water paste is then applied to the section ADE. The second folding stage (d) is to fold along a line CE so that the section BCE covers the preceding section and seals to it. Paste it then applied to the section BCE. The final folding stage (e) is to fold along a line DE so that the section DOC covers the preceding two sections and seals the filling completely within a pastry envelope.

Figure 5:
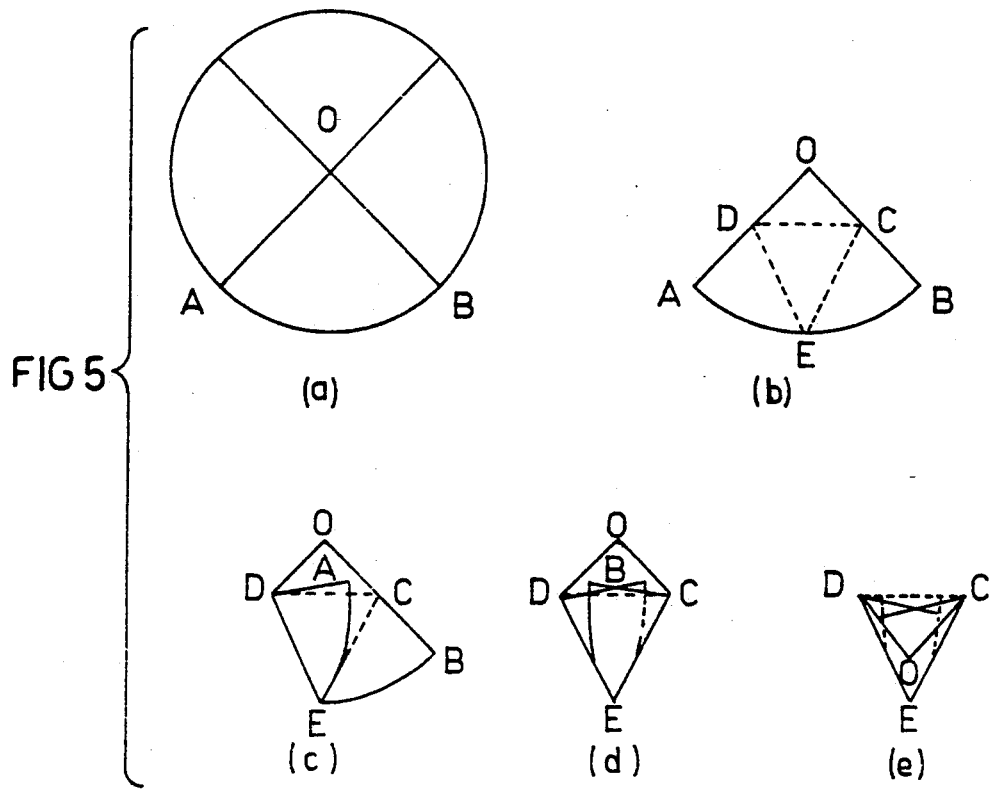
FIG. 5 is a diagram of a method for folding samoosas around a portion of filling.
Figure 6:
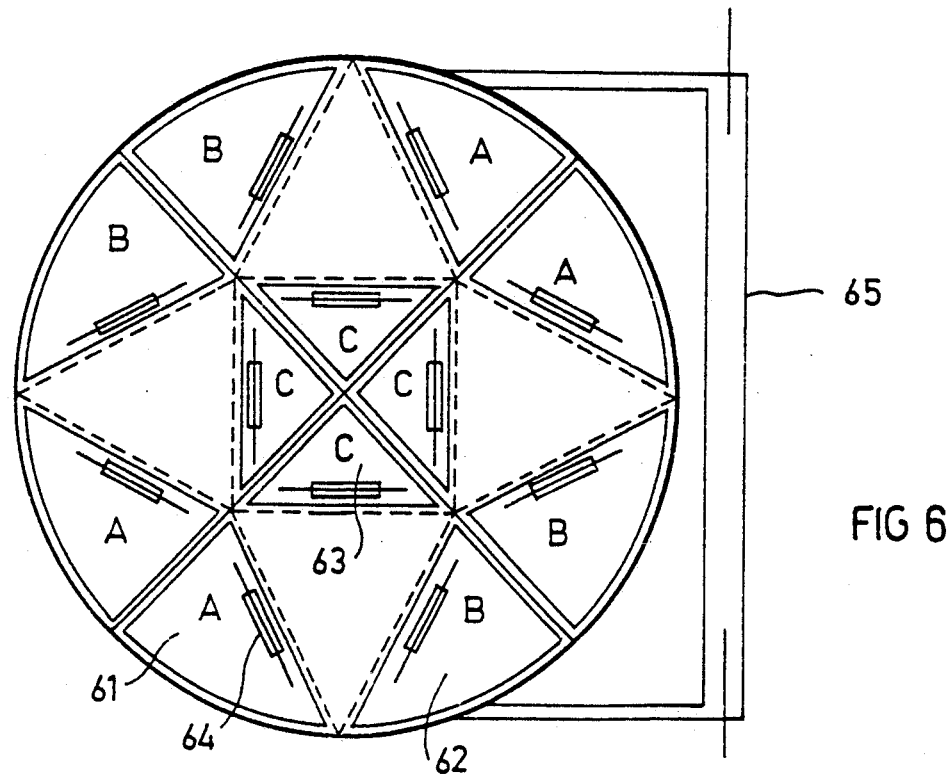
FIG. 6 is a plan of a folding station.

With reference to FIG. 6 the folding station is shown in plan view. A disc of pastry is placed on the station by means of the lifting pad 27 of FIG. 2. The cutting blade 9 of FIG. 1 then descends and cuts the pastry into quarters. The folding station has four identical parts each comprising three hinged plates A, B, C, identified by the reference numerals 61, 62, 63, respectively. These plates hinge about the dashed lines shown and perform the folding operation Described above (FIG. 5). In the first stages the four plates labelled A move simultaneously under the action of one or two linear actuators mounted under the folding station and connected by pivots (64) to the lower surface of the plates (61). The plates A rotate about a horizontal axis through approximately 180 degrees. In the second stage the four plates labelled B move similarly. In the final stage the four plates labelled C move under the action of a single linear actuator to complete the folding process. Before the second stage and before the final stage the pasting spray (7) of FIG. 1 applies paste to the four pastries undergoing folding. When the samoosas are complete they may be ejected from the folding station by tilting it about an axis (65). Alternatively the cutter (9) of FIG. 1 can descend onto the folding station and sweep the samoosas away by a lateral movement.

Figure 7:
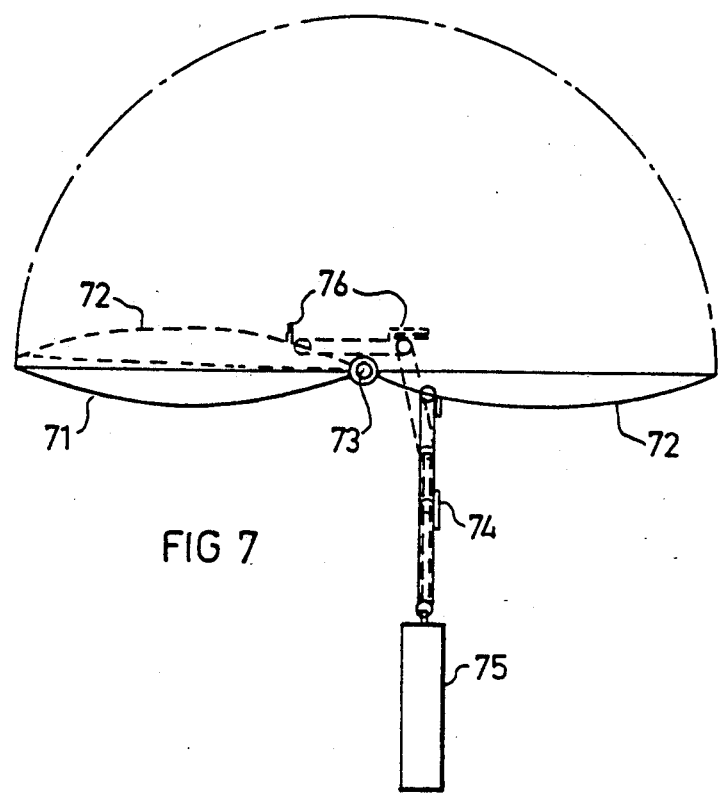
FIG. 7 is an elevation of a mechanism for folding leaves of pastry around a filling.

With reference to FIG. 7 a detailed elevation of part of the folding mechanism is shown. The plate (71) represents the central, non-moving portion of one of the quarters of the folding station. The plate (72) represents one of the moving plates 61, 62, 63 of FIG. 6. Plate 72 is hinged along its line of attachment to the fixed plate 71. Both the plates 71, 72 may be dished as shown so as to accommodate the thickness of the pastry. Plate (72) performs the folding operation by rotating about hinge (73) under the action of an actuator (75) which is connected to a point on the plate (72) by a linkage (74). The linkage (74) is so arranged that linear motion of the actuator (75) drives the plate (72) in a circular path to the position shown by dashed lines. This is achieved by means of a two-part linkage with motion stops (76) which prevent 'collapse' of the linkage under the force from the actuator. The final position of the linkage is shown by dashed lines. In order to achieve the folding pattern of FIG. 6 one actuator may be connected to one, two or four linkages so that a corresponding number of plates are simultaneously driven.

ROTI/CHAPATI PROCESS

With reference to FIG. 1 the process for making chapatis or other flat breads is as follows: the extrusion station produces a disc of dough which may be thicker than that used for samoosas. The lifting pad (27) then transfers the chapati, which may be partly cooked on the underside at station 1, to the cooking station 2A where a heating or grilling element (11) finishes the cooking process from above. Heat can also be applied from beneath at Station 2A if desired by the provision of another element (12). The finished chapati may then be ejected from the cooking station by tilting the lower plate of the station or otherwise.

TORTILLA PROCESS

Figure 8A:
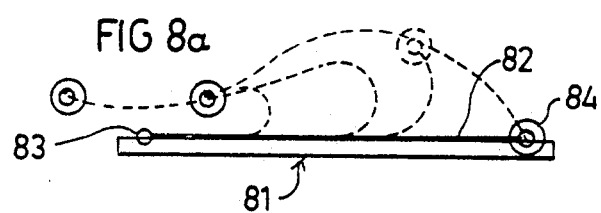
FIG. 8a is a side elevational view, of a mechanism for rolling a sheet of pastry around a filling.
Figure 8B:
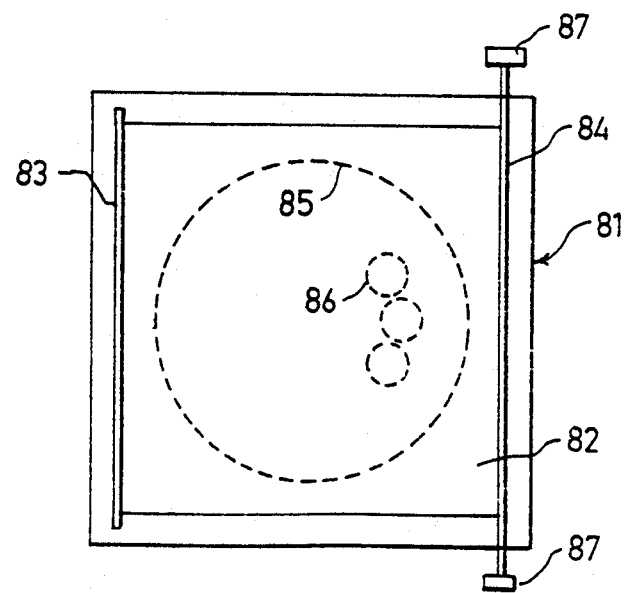
FIG. 8b is a top plan view.

With reference to FIGS. 1 and 8 the process for making filled tortillas (enchiladas) is as follows: A cooked disc of dough is produced at extrusion station 1 and transferred to the filling station (3). FIG. 8 shows an alternative arrangement of the station (3) whereby the folding mechanism is replaced by a rolling mechanism. This comprises a plate (81) covered by an initially flat, thin, flexible sheet (82) which is attached by a hinge (83) to the plate (81) at one end. The disc of dough or tortilla (85) is deposited on the sheet 82 and the filling mechanism of FIG. 4 deposits one or more portions of filling (86) onto the tortilla in the approximate positions shown. The free edge (84) of the sheet (82) then moves along a curved path, such as that shown by a chain dotted line; for this purpose the edge (84) may be extended and fitted with rollers (87) which run in shaped grooves in a vertical plane (not shown). The result of the movement of sheet (82) is the rolling of the tortilla around the filling. The filled tortilla may then be ejected from the rolling station beyond the hinge (83) into the collection point (4) and the sheet returns to its initial flat position.

I claim:

1. A process for producing a food product, comprising:
   forming a thin layer of dough in a first station by extruding dough through a central hole in a lower plate to the upper surface of said lower plate, and effecting relative movement between said lower plate and an overlying plate, to flatten said dough into a thin layer of predetermined thickness and area;
   lifting the thin layer of dough from the first station by a suction pad and transferring it to a second station;
   applying a filling material to the thin layer of dough while in said second station;
   and closing the peripheral edges of the thin layer of dough around the filling material.

2. The process according to claim 1, wherein the thin layer of dough, while in said second station, is cut into triangles, and the peripheral edges of each triangle are closed by folding each of the apices of the triangle over the filling material.

3. The process according to claim 1, wherein the thin layer of dough is formed of circular shape in said first station and is cut into four substantially triangular sections in said second station, said filling material being applied to the center portion of each of said substantially triangular sections, each of said sections being closed by folding each of the apices of the triangle over the filling material.

4. The process according to claim 1, wherein the thin layer of dough is placed on a flexible sheet in said second station before the filling material is applied thereto; and the peripheral edges of the thin layer of dough are closed around the central portion containing the filling material by moving one edge of the flexible sheet, and the respective edge of the thin layer of dough thereon, through a circular arc to the opposite edge of the flexible sheet and the respective edge of the thin layer of dough thereon, to bring said two edges of the thin layer of dough into contact with each other.

5. A process for producing food products, comprising:
   extruding dough through a central hole of a lower plate to the upper surface of said lower plate;
   effecting relative movement between said lower plate and an upper plate overlying said lower plate to flatten said dough to a disc shape of predetermined thickness and diameter; and
   cooking said dough.

6. The process according to claim 5, wherein said disc of dough is at least partially cooked by heating the dough disc when carried by said lower plate.

7. The process according to claim 5, wherein:
   said dough disc is transferred to a stacking plate and cut into four equal quarters;
   filling material is applied to each quarter; and
   each quarter is then folded to enclose its respective filling material.

8. The process according to claim 7, wherein:
   said filling material is applied to each quarter when the respective quarter is carried by a fixed triangular plate; and
   each quarter is folded by pivotting three triangular plates around the three sides of said fixed triangular plate.

9. The process according to claim 7, wherein:
   a plurality of discs of dough are stacked on said stacking plate;
   oil is applied to the upper surface of each disc of dough before the next disc is stacked thereon;
   said stack of dough discs being cut into said four equal quarters.

* * * * *